Sept. 20, 1966  E. G. DE HART  3,273,477
RANDOM EVENTS CAMERA AND METHOD
Filed Dec. 31, 1963  2 Sheets-Sheet 1

INVENTOR
Edward G. DeHart
BY
Jack Larsen
ATTORNEY

INVENTOR
Edward G. DeHart
BY Jack Larsen
ATTORNEY 3,273,477
RANDOM EVENTS CAMERA AND METHOD
Edward G. De Hart, Boston, Mass., assignor to De Haart, Inc., Cambridge, Mass., a corporation of Massachusetts
Filed Dec. 31, 1963, Ser. No. 334,710
6 Claims. (Cl. 95—11)

The present invention relates to a unique method and apparatus for photographically recording random events, i.e., events which occur at some unpredictable future time.

More specifically stated, the instant invention has to do with an improved method and apparatus for recording random events on a reuseable phosphor coated film belt, storing these recorded events, permanently recording selected events and subsequently erasing the film belt for futher use. The apparatus and method of this invention have given a remarkable contribution to the art by providing a method of recording random events on a reusable medium using apparatus which minimizes cost while maintaining optimum durability and efficiency.

An economical system for the recording of random events, and for obtaining data and information concerning them, has long been sought both by science and by industry. Such a system has been sought as a means of selectively monitoring these random events with a view towards anticipating them and eventually preventing them. As examples of repetitious random events which are suitable for recording, except for the prohibitive cost of prior methods, mention may be made of airplane crashes (as viewed from inside the cockpit or from the end of an airport runway), robberies and holdups of banks, random breakdowns or failures in mechanical equipment, materials testing where failure time is unpredictable, and many other events of a similarly unpredictable nature.

Generally speaking, previous systems for the recording of such events fell into one of two classes. One class, conventional silver-halide photography, required only a relatively small initial capital outlay but it involved a large and continuing expense to keep the camera supplied with film—due to its nonerasable nature. The other class, magnetic or video tape-type systems, avoided the continuing supply cost problems of silver halide photography, but with such a high original capital outlay for acutely sensitive equipment that it is prohibitive in all but the largest of operations. Furthermore the expense and weight penalty of placing these video cameras in operation, e.g., in the cockpit of every commercial plane in the United States would stagger the imagination and far exceed the probable value of any information it might collect. It is also obvious that we cannot estimate the cost of recording such events on even the cheapest of silver halide type photographic films with a conventional camera in every commercial airline cockpit. Yet, it is manifest that visual evidence of what occurred in prior airplane crashes would be of enormous assistance in preventing similar future events . . . with an attendant saving of many human lives.

The present invention improves this art of recording random events in a unique manner. Broadly stated, the method of this invention comprises selectively filtering the light emitted or reflected from the random event, focussing this filtered light upon and thereby exposing a frame of a reusable medium, e.g., a phosphor which can absorb light of the filtered frequency and which will release that light when stimulated with light of another frequency; transporting said exposed frame to a memory bank area; retrieving said stored frame and transporting it to a read-out area, for selectively printing desired frames by exposing said frames to light of the proper stimulating frequency and recording the light thus released; and passing the exposed medium through an erase section where the medium is de-energized for recycling through the same process.

Accordingly, it is a primary object of the present invention to provide an improved method and apparatus for recording random events.

Another object of the invention is to provide a method of recording random events which employs the impingement of selectively filtered light upon a reusable recording medium adapted to release said impinged light when stimulated with light of dissimilar frequency.

Yet another object of the instant invention is to provide novel apparatus comprising means for recording random events, means for storing these recorded events and means for selectively printing these events.

A still further object of this invention is to provide a phosphor coated film belt for use in said novel apparatus.

Other objects of the instant inventive method and apparatus will be more readily ascertained from an inspection of the following specification taken in conjunction with the accompanying drawings, while the features of novelty will be more distinctly pointed out in the appended claims.

The present invention, then, provides apparatus for recording random events which comprises means for focussing a pattern of suitable radiation upon an endless belt of phosphor-coated film whereby said film is sufficiently exposed to form a latent image thereon. A preferred composition of said phosphor is zinc sulphide activated with lead and copper. It is to be noted that a plurality of such exposures may be made in a cinematic manner, viz a series of separate images, taken at intervals in a continuing cycle. The apparatus further comprises means for passing the thus exposed film through a memory bank mechanism to store a predetermined number of images or "frames." A preferred embodiment of said memory bank mechanism comprises a staggered series of rollers. The apparatus still further comprises means for passing the film through a printout mechanism, an erasure mechanism and means for passing the film through said erasure mechanism. Thus the apparatus is constantly recording random events as the endless belt is continuously recycled with each separate image being subsequently erased automatically until a permanent record is desired, at which time the printout means is activated.

Figure 1:
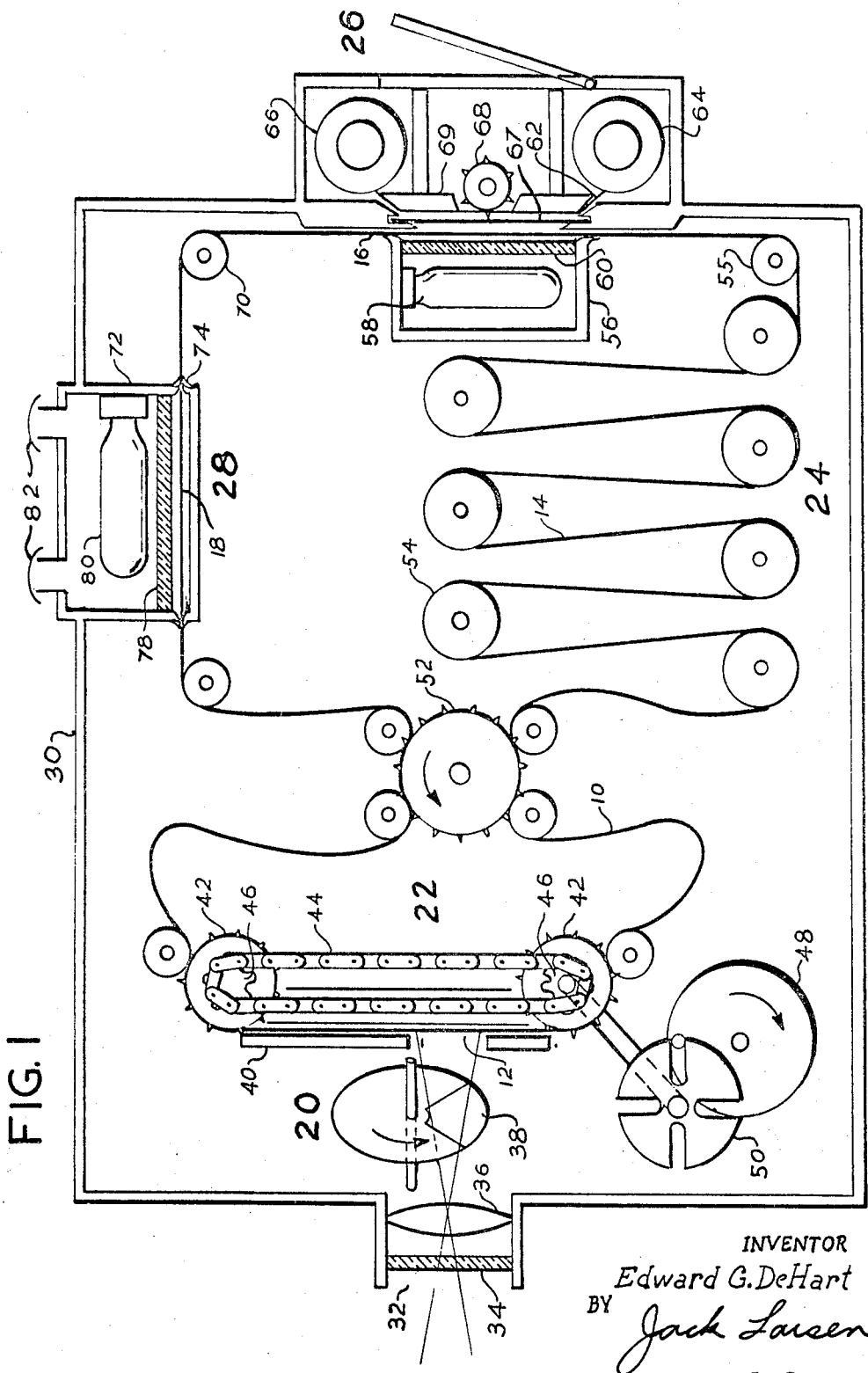
FIGURE 1 illustrates a preferred embodiment of the novel apparatus of the present invention.

The previously mentioned process of the instant invention is illustrated by the embodiment disclosed in FIGURE 1 which shows a continuous belt of film 10 exposed at frame 12. Film belt 10 may conveniently be divided into a memory bank section 14, a printout or readout section 16 and an erasing section 18. It is to be noted that the number of frames which need be stored depends upon the nature of the recorded events and the time lapse between the initial recording and the final reading out.

Once more with reference to FIGURE 1 it is seen that this random events camera, in its simplest form, must include an exposure mechanism 20, a drive mechanism 22, a memory bank mechanism 24, a read out mechanism 26 and an erasure mechanism 28. For example, a point e.g., exposed frame 12, on film belt 10 is made to progressively pass through exposure mechanism 20, memory bank mechanism 24, read out mechanism 26 and through erasure mechanism 28, at which time the cycle is repeated.

Again referring to FIGURE 1, it is shown that a preferred embodiment of the camera comprises a camera housing 30 which is "light tight" to those types of radiation to which the phosphors on film belt 10 are photosensitive. Housing 30 is seen to define an aperture 32, a preferred embodiment of which is bounded by a tubular extension. The camera further comprises an entrance filter 34 and a focussing lens system 36, both of which are seated within said tubular extension, and a shutter 38 mounted within housing 30 coaxial of said filter, lens and aperture. A preferred embodiment of an entrance filter 34 is substantially opaque to infra-red radiation. A spring-loaded pressure plate 40 is mounted behind shutter 38. Plate 40 maintains the phosphor-coated film belt 10 in a fixed position during exposure and acts as a guide when film belt 10 is translated to bring the adjacent frame into position for exposure. The main drive mechanism for film belt 10 is a pair of sprocket wheels 42 which are spaced from one another and are placed at opposing sides of pressure plate 40. A driving relationship is achieved by perforating a continuous series of holes along one or both edges of film belt 10 and indexing these holes with the teeth of sprocket wheels 42. Movement of these sprocket wheels is coordinated by means of a drive chain 44 which is adapted, alternatively to engage either a pair of first gear members 46 or sprocket wheels 42. This overall drive force is transmitted from a variable drive means 48 to a star wheel 50 which in turn is connected in driving relation to one of the sprocket wheels 42. The variable drive means 48 is also connected to a sprocket guide wheel 52 which assists in driving film belt 10. The driving force of guide wheel 52 is not brought to bear upon that section of film belt 10 between sprocket wheels 42 because there are loops formed in said film belt between each of said sprocket wheels and guide wheel 52. These loops are maintained by the spacial relation between sprocket wheels 42 and guide wheel 52 and they allow a portion of film belt 10 to be stopped during exposure while the remainder of said film belt is under driving force from guide wheel 52.

A series of rollers 54, in staggered spaced relation to each other, make up the major elements of memory bank mechanism 24. Film belt 10 is threaded around rollers 54 as shown in FIGURE 1. The final roller 55 of the memory bank mechanism is spaced from readout mechanism 26 and is on substantially the same plane. This provides means for guiding film belt 10 from memory bank mechanism 24 to readout mechanism 26. Readout mechanism 26 comprises a generally light-tight readout-lamp enclosure 56 and a readout lamp 58 mounted within enclosure 56 and in electrical communication with a suitable means of energy (not shown). Lamp enclosure 56 is completely within camera housing 30 and defines a window in a side contiguous to film belt 10. A readout filter 60 fills this window so that radiation generated by readout lamp 58 passes thru filter 60 and impinges upon film belt 10. The properties of readout filter 60 are so chosen that the impinging radiation causes the phosphor to radiate, as actinic rays, a portion of the energy stored in the latent image which previously had been impressed in film belt 10 by the energizing of the phosphor resulting from the exposure by lens system 36.

Still referring to FIG. 1, there is illustrated a conventional silver-halide photosensitive film strip 62 wound upon a storage reel 64 and threaded about a take-up reel 66. The strip 66 is shown separated from the belt 10 by a thin, smooth metal slide 67. Intermediate the two reels 64 and 66 is a film sprocket wheel 68 which is rotatably mounted such that its teeth index with sprocket holes in both film belt 10 and film strip 62. Sprocket wheel 68, slide 67, and a platen 69 are all movable to permit the camera to make a permanent record on the strip 62 when one is required.

In its normal "forgetting" mode of operation, no permanent records are taken, the sprocket wheel 68 is dis-engaged from the belt 10, the platen 69 is loose, and the slide prevents scratching of the strip 62 which remains fixed as the belt 10 moves past on the other side of the slide.

For recording, the slide 67 is removed, the sprocket 68 is engaged, and the belt 10 and strip 62 are drawn through the readout mechanism 26 with each frame on the film belt 10 held in intimate contact-printing relationship with the photosensitive strip 62 by pressure of the platen 69. In this manner, the temporarily stored images on film belt 10 may be copied for a more permanent record. The permanent record is then made from the silver-halide film by well known development techniques.

A preferred embodiment of readout filter 60 transmits radiation only in the infra-red region. For maximum contrast in the permanent record, the intensity of the stimulating infra-red radiation transmitted by filter 60 is held to a level which leaves most of the stored energy in film belt 10. To prepare the film belt for a recirculation through the camera, it is passed through erasing mechanism 20. Guided by a roller 70, the belt enters an erasure lamp enclosure 72 rendered generally light-tight by light-seals 74. An erase filter 78 excludes energizing radiation omitted by erasure lamp 80 from the film belt while permitting it to be fully erased by the stimulating radiation omitted from lamp 80. A preferred embodiment of filter 78 is substantially transparent to infra-red radiation but need not cut off between red and infra-red so sharply as the filter 60. Furthermore, because of the much greater intensity of erasure lamp 80, as compared to readout lamp 58, provision for cooling is provided, e.g., cooling vents 82. From erasure mechanism 28, film belt 10 is guided by second guide roller 84 back to sprocket guide wheel 52 from whence it begins another circuit of the camera.

In the preferred embodiment of the camera, then, film belt 10 is energized by light in the visible to near ultra-violet portion of the spectrum and stimulated by infra-red radiation. For this a film comprising a polystyrene base, coated on one side with a butylmethacrylate binder containing comminuted phosphor zinc sulphide doubly activated with lead and copper has been found satisfactory and is preferred. Other combinations may be formulated to meet diverse operational requirements. Indeed great sensitivity is achieved by using a strontium-sulphide phosphor doubly activated with samarium and yttrium.

Furthermore, the preferred embodiment of this camera represents a design balance of filters 34, 60 and 78. As stated previously, it is desired that entrance filter 24 transmits visible light but is substantially opaque to infra-red radiation. It has been found, however, that a relatively inexpensive filter (having a relatively tapered cut off point) is satisfactory. As was also stated above, it is preferred that readout filter 60 be substantially opaque to all radiation other than infra-red. This has been found to be quite critical, thus necessitating a more expensive, sharply defined filter. (It is within the scope of the present invention, however, to produce the same net effect by choosing readout lamp 58 to be a totally infra-red emitter, thereby eliminating the need for filer 60.) Also, as stated above, it is preferred that erase filter 78 be substantially opaque to all radiation other than infra-red. Here again the filter may be relatively inexpensive due, in part, to the higher power of erasure lamp 80. Lamp 80 could also be an infra-red emitter for reasons similar to those already mentioned.

The resolving power of the previously described camera system depends to a large degree upon the quality of the phosphor film used. Phosphorescence is a property of the crystal. Accordingly the property is not lost as the crystals are made smaller and smaller so long as there are at least several hundred atoms in each crystal.

Figure 2:
FIGURE 2 is a cross sectional view of the novel reusable recording medium of this invention.

As shown in FIGURE 2, the phosphor tape comprises a number of different components for optimum performance. The elements of this photo-sensitive phosphor tape, in order taken from the light sensitive surface, comprises phosphor particles 100, a binder 102 (preferably butylmethacrylate) and a polystyrene strip 106. The mechanical properties of these elements must be such that they will adhere together.

Figure 3:
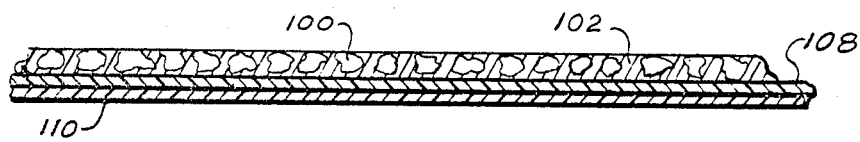
FIGURE 3 is a cross sectional view of an alternate embodiment of the recording medium illustrated by FIGURE 2.

FIGURE 3 depicts an alternative embodiment of the phosphor tape shown in FIGURE 2. This embodiment is seen to comprise phosphor particles 100, binder 102, a second binder 108 and a reflective backing 110. It is desired that the above components have certain specific optical properties. Phosphor particles 100, are energized by high frequency radiation, which for convenience is termed herein "violet" light, emit a somewhat lower frequency radiation, which is termed herein "orange" light, and are capable of being stimulated by still shorter frequency radiation which is termed "infra-red." Binder 102 preferably transmits orange and violet and reflects or absorbs infra-red. Second binder 108 preferably is dyed to absorb violet and orange and transmit infra-red. It is preferable that reflective backing 110 transmits at least 25 percent of the infra-red and reflects at least 75 percent of the violet and orange light to provide a partial filter and anti-halation backing.

The process for laying down various layers may be any of several well-known processes for coating tape. It has been found acceptable to deposit the butylmethacrylate thinned to a liquid with methyl-ethyl ketone. It is apparent that some improvement in resolution results if phosphor particles 100 are oriented with their long dimensions perpendicular to the tape. This may be accomplished by a modification of the electrostatic coating process disclosed in re-issue Patent Re. 22,419, granted January 11, 1944, to J. S. Smyser, covering a method for making abrasive articles.

Figure 4:
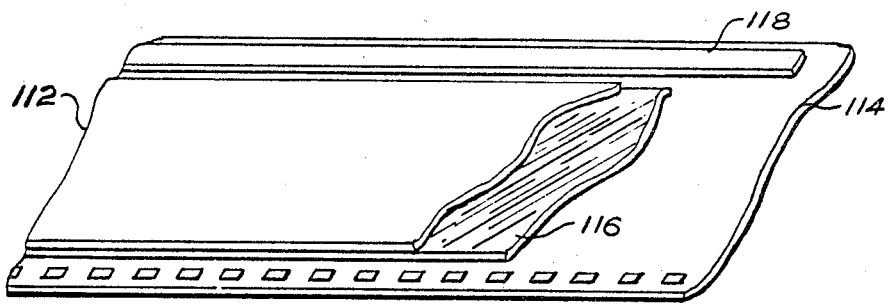
FIGURE 4 is a partially cut away view of another alternate embodiment of a recording medium suitable for use with the novel apparatus of this invention.

FIGURE 4 illustrates a preferred adaptation of the phosphor tape for the instant inventive apparatus. This adaptation is seen to comprise phosphor tape 112 bonded to carrier belt 114 by infra-red-passing, actinic-reflecting adhesive 116. A measure of tape-length distance is provided by ordinate measuring means 118. This may be a magnetic recording coating or a coded pattern of inscribed lines, either of which may be employed to measure the distance separating any two frames.

Via the preceding specification, then, it will be readily apparent that the stated objects of the present invention, among other objects, have been achieved. It should now be apparent that this invention is capable of a number of modifications. One such general modification should be mentioned, namely, the infra-red recording ultra violet erasing mode in which the erasing radiation is ultra violet, fully energizing the phosphor. The images are then created by infra-red light selectively exhausting the stimulated phosphor. Both basic phosphor processes are disclosed in patents to Urbach 2,482,813 and 2,482,815. In the infra-red photographic mode the tapes of FIGS. 3 and 4 could not be used.

Such modifications will be understood and the invention limited by the scope of the appended claims.

What is claimed is:

1. A random events camera, comprising in combination, a camera housing defining an aperture, a lens in said aperture, a cinematic exposure means behind said lens, a film belt drive mounted within said camera housing, a film belt memory bank mechanism mounted within said camera housing, a film belt print-out mechanism affixed to and partially penetrating said camera housing, a film belt erasure mechanism mounted within said camera housing, and a continuous-loop belt or phosphor-coated film threaded through said mechanisms, in the order named and engaged by said drive, characterized in that said film belt printout mechanism comprises
   (a) a substantially light-tight lamp enclosure which defines a window and is mounted within said camera housing,
   (b) a lamp mounted within said lamp enclosure,
   (c) a filter mounted in said window, said filter being substantially transmissive to only infra-red radiation,
   (d) guide means mounted within said camera housing for guiding said film belt past said filter, and
   (e) a photosensitive film strip, and
   (f) a sprocket wheel indexing both said belt and said strip to maintain said strip in contact print relation with the portion of said film belt adjacent said filter.

2. In a random events camera, the combination comprising a camera housing defining an aperture, a film belt drive mechanism mounted within said camera housing, a film belt memory bank mechanism mounted within said camera housing, a film belt print-out mechanism affixed to and partially penetrating said camera housing, a film belt erasure mechanism mounted within said camera housing, a continuous belt of phosphor-coated film wound through said mechanisms, and an exposure means at said aperture for forming successive images of a scene on said belt, characterized in that said film belt printout mechanism comprises
   (a) a substantially light-tight lamp enclosure which defines a window and is mounted within said camera housing,
   (b) a lamp mounted within said lamp enclosure,
   (c) a filter mounted in said window, said filter being substantially transmissive to only infra-red radiation,
   (d) guide means mounted within said camera housing for guiding said film belt past said filter, and
   (e) a photosensitive film strip, and
   (f) a transport means affixed to said camera housing for holding said strip in contact print relation with the portion of said film belt adjacent said filter.

3. A random events camera, comprising in combination, a camera housing defining an aperture, a lens in said aperture, a cinematic exposure means behind said lens, a film belt drive mounted within said camera housing, a film belt memory bank mechanism mounted within said camera housing, a film belt print-out mechanism affixed to and partially penetrating said camera housing, a film belt erasure mechanism mounted within said camera housing, and a continuous-loop belt of phosphor-coated film threaded through said mechanisms, in the order named and engaged by said drive, characterized in that said film belt erasure mechanism comprises
   (a) a substantially light-tight lamp enclosure which defines a generally light-tight film belt inlet and outlet, said lamp enclosure mounted within said camera housing,
   (b) a relatively high powered lamp mounted within said lamp enclosure,
   (c) a filter mounted in said lamp enclosure and defining a boundary between said lamp and said film belt inlet and outlet,
   (d) guide means mounted within said camera housing for guiding said film belt through said lamp enclosure.

4. In a random-events camera, the combination comprising,
   (a) a camera housing defining an aperture,
   (b) a film belt drive mechanism mounted within said housing,
   (c) a film belt memory bank mechanism mounted within said housing,
   (d) a print-out mechanism comprising,
      (i) a substantially light-tight lamp enclosure within said housing and having a window therein,
      (ii) a lamp mounted within said enclosure,
      (iii) a filter in said window for substantially limiting transmission of light from said lamp to only infra-red radiation,
      (iv) guide means within said housing for guiding said belt past said window in the path of said radiation, and (v) a record film holder affixed to said housing comprising means for maintaining a record film in contact print relation with the portion of said film belt adjacent said filter,
(e) a film belt erasure mechanism mounted within said housing,
(f) a continuous belt of phosphor-coated film wound through said mechanisms, and
(g) an exposure means at said aperture.

5. In a random events camera the combination comprising
(a) a camera housing defining an aperture,
(b) a drive mechanism for a film belt,
(c) a film belt memory bank mechanism mounted within said housing,
(d) a film belt print out mechanism affixed to and partially penetrating said housing,
(e) a film belt erasure mechanism comprising,
   (i) within said housing a substantially light-tight enclosure which defines a generally light-tight film belt inlet seal and a generally light-tight film belt outlet seal,
   (ii) a relatively high powered lamp mounted within said lamp enclosure, and
   (iii) a filter mounted in said enclosure between said lamp and said seals, said filter being substantially transmissive to only infra-red radiation,
(f) guide means mounted within said housing for guiding a continuous phosphor coated film belt through said mechanisms and said seals, and,
(g) an exposure means at said aperture.

6. A random events camera comprising
(a) a continuous strip of phosphor film,
(b) a lens and a shutter for exposing a frame of said film to a scene,
(c) motion picture camera means for advancing successive frames of said film past said shutter,
(d) a camera housing,
(e) a substantially flat base plate within said housing,
(f) a plurality of rollers connected to said plate and constrained to rotate about axes substantially perpendicular to said plate,
(g) means including said rollers for freely guiding said film past a readout position,
(h) an enclosure at said position containing an infra-red light source, said enclosure having an opening therein substantially the width of said frames and having a length somewhat greater than the height of one of said frames,
(i) a secondary film strip,
(j) means for positioning said secondary film strip in substantially parallel spaced-apart relationship to said phosphor film strip at said readout position,
(k) a removable thin slide between said phosphor film and said secondary film,
(l) means for squeezing said phosphor film between said housing opening and said secondary film proportioned so that said primary film and said secondary film are placed in face-to-face contact-printing relationship, and
(m) a second source of infra-red light of substantially cylindrical shape.

References Cited by the Examiner

UNITED STATES PATENTS

| | | | |
|---|---|---|---|
| 1,724,572 | 8/1929 | Geisen | 88—24 |
| 2,024,627 | 12/1935 | Crabtree | 95—1.1 |
| 2,906,162 | 9/1959 | Taylor | 95—11 |
| 3,016,812 | 1/1962 | Chatlam | 95—11 |
| 3,037,137 | 5/1962 | Motson | 313—108 |
| 3,144,295 | 8/1964 | Le Massena | 346—109 |

JOHN M. MORAN, *Primary Examiner.*